United States Patent [19] [11] 3,929,816
Rathgeb et al. [45] Dec. 30, 1975

[54] HERBICIDAL THIADIAZOLYL-UREAS

[75] Inventors: Paul Rathgeb, Basel; Christian Vogel, Binningen; Anton G. Weiss, Benken, all of Switzerland

[73] Assignee: Ciba-Geigy Corporation, Ardsley, N.Y.

[22] Filed: June 28, 1974

[21] Appl. No.: 484,047

Related U.S. Application Data

[62] Division of Ser. No. 842,023, July 15, 1969, abandoned.

[30] Foreign Application Priority Data

July 17, 1968 Switzerland.................. 10691/68

[52] U.S. Cl............................ 260/306.8 D; 71/90
[51] Int. Cl.².................................. C07D 285/12
[58] Field of Search........................ 260/306.8 D

[56] References Cited
FOREIGN PATENTS OR APPLICATIONS
1,816,568  11/1970  Germany.................. 260/306.8 D OTHER PUBLICATIONS
Metzger et al., Chem. Abstracts, 74:13162g (1971).

Primary Examiner—Richard J. Gallagher
Attorney, Agent, or Firm—Frederick H. Rabin

[57] ABSTRACT

New 1,3,4-thiadiazolyl-(2)-ureas are disclosed as herbicidally active compounds of enhanced toxicity to undesirable plant growth and improved selectivity. A method of controlling undesirable plant growth with the aid of such compounds and compositions containing them is also described.

3 Claims, No Drawings

HERBICIDAL THIADIAZOLYL-UREAS

This is a DIVISION of application Ser. No. 842,023, filed on July 15, 1969, now abandoned.

DESCRIPTION OF THE INVENTION

The present invention concerns new 1,3,4-thiadiazolyl-(2)-ureas, processes for the production thereof, furthermore, herbicidal agents containing such ureas as active ingredients, and methods for the control of weeds and wild grasses using the novel active substances or agents containing them.

The novel 1,3,4-thiadiazolyl-(2)-ureas correspond to the Formula I:

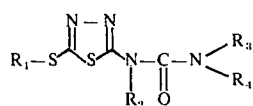     (I)

In this formula:

$R_1$ represents an aliphatic or cycloaliphatic saturated or unsaturated hydrocarbon radical having at most 6 carbon atoms, which may be unsubstituted or substituted by halogen or lower alkoxy, $R_2$ represents hydrogen, a lower aliphatic or cycloaliphatic hydrocarbon radical having at most 6 carbon atoms, $R_3$ represents hydrogen or a lower alkyl radical having at most 6 carbon atoms, $R_4$ represents an aliphatic or cycloaliphatic, saturated or unsaturated hydrocarbon radical having at most 10 carbon atoms, which may be unsubstituted or substituted by halogen or lower alkoxy or a lower alkoxy radical having at most 6 carbon atoms.

In the general Formula I, $R_1$, $R_2$ and $R_4$ as aliphatic hydrocarbon radicals are straight chains or branched chains, in particular lower alkyl radicals such as the methyl, ethyl, n-propyl, isopropyl, n-butyl, sec-butyl, tert-butyl and isobutyl radicals as well as pentyl and hexyl radicals, furthermore simple unsaturated aliphatic hydrocarbon radicals such as alkenyl and alkinyl radicals, e.g. the allyl or methallyl radical, furthermore propenyl, propynyl, (propargyl) and alkylpropynyl radicals. Such aliphatic hydrocarbon radicals, in the case of $R_1$ and $R_4$, can be substituted by one or more halogen atoms, such as fluorine, bromine and/or iodine. For an ether-type substitution of the aliphatic radicals mentioned, lower alkoxy and alkylthio radicals are suitable. Lower alkyl radicals also form the alkyl portion of ether-type alkoxy and alkylthio substitutents. In the resulting alkoxyalkyl and alkylthioalkyl radicals, the sum of the carbon atoms should preferably not exceed 6. Cycloaliphatic hydrocarbon radicals $R_1$, $R_2$ and $R_4$ represent preferably saturated ones, i.e. cycloalkyl radicals. One cycloalkyl radical $R_1$ and $R_2$ is monocyclic, having at most 6 carbon atoms, one cycloalkyl radical $R_4$ can be mono- or polycyclic and have up to 10 carbon atoms. The following radicals are examples: cyclopropyl, 1-methylcyclopropyl, cyclobutyl, cyclopentyl, cyclohexyl, cycloheptyl, cyclooctyl, bicyclohexyl, bicycloheptyl, bicyclooctyl, tricyclononyl, tetracyclononyl.

The novel 1,3,4-thiadiazolyl-(2)-ureas of Formula are produced according to the present invention by converting a 2-amino-1,3,4-thiadiazole of the Formula II:

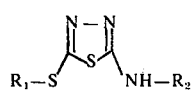     (II)

either with a halogen carbonic acid ester or with phosgene in the presence of an acid-binding agent into a carbamic acid derivative and reacting this with an amine of the Formula III:

     (III)

wherein $R_1$, $R_2$, $R_3$ and $R_4$ are as defined under Formula I. As halogen carbonic acid esters, preferably chlorocarbonic acid phenyl esters and chloro-thiocarbonic acid phenyl esters are employed. In this way, for example, the following carbamic acid derivatives are obtained:

N-[5-thio-1,3,4-thiadiazolyl-(2)]-O-phenyl-carbamate,

N-[5-thio-1,3,4-thiadiazolyl-(2)]-O(S)-phenyl-thiocarbamate,

N-[5-thio-1,3,4-thiadiazolyl-(2)]-carbamoyl-chloride, in almost quantitative yields.

Halogen carbonic acid esters and thiocarbonic acid-phenyl esters are known or can be produced by known methods. Compare: D. G. Crosby et al. [J. Am. Chem. Soc. 76, 4458 (1954)].

As acid-binding agents, preferably tertiary amines such as trialkyl amines, pyridine bases, etc., furthermore hydroxides and oxides of alkali and alkaline earth metals are employed. The reaction temperatures lie between 0° and 150°C. The reaction of such carbamic acid derivatives with a primary or secondary amine of Formula III is performed at temperatures between −40° and 150°C, preferably between 0° and 100°C. The urea derivatives according to the invention are obtained in good yields and high purity. The novel compounds are stable and soluble in conventional organic solvents, they are, however, sparingly soluble in water.

The 1,3,4-thiadiazolyl-(2)-ureas of Formula I in which $R_3$ represents hydrogen are produced by a modification of the process according to the invention by reacting a 2-amino-1,3,4-thiadiazole of Formula II with an isocyanate of Formula II with an isocyanate of the Formula IV:

$R_4\text{-NCO}$     (IV)

wherein $R_4$ is as defined under Formula I.

The processes described are performed in the presence of solvents or diluents which are inert to the reaction components. The following are, for example, suitable:

aliphatic and aromatic hydrocarbons and halohydrocarbons such as benzene, toluene, xylene, chloroform, chlorinated ethylenes; N,N-dialkylated amides such as dialkylformamides; ether and ether-type compounds; higher ketones such as methylethyl ketone; etc.

According to a further modification of the present invention, the novel 1,3,4-thiadiazolyl-(2)-ureas of Formula I are obtained by reacting a 5-mercapto-1,3,4-thiadiazolyl-urea of the Formula V

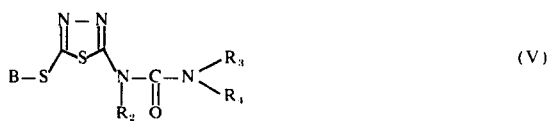

wherein

B represents hydrogen, the sodium or potassium ion or the equivalent of an alkaline earth metal ion, and $R_2$, $R_3$, $R_4$ have the meaning given for Formula I, with a halide of the Formula VI, $$R_1 - Hal. \qquad (VI)$$

In this formula

Hal represents chlorine, bromine or iodine, and $R_1$ has the meanings given for Formula I.

This reaction is optionally performed in the presence of bases and in the presence of solvents or diluents which are inert towards the reaction components. The reaction temperatures lie in the range of from 0° to 150°C, preferably between 20° and 100°C. Instead of the esters of hydrohalic acids (VI), the corresponding esters of other acids, e.g. esters of sulfuric acid such as dialkyl sulfates or esters of aromatic sulfonic acids such as o-toluene sulfonates can also be employed.

Furthermore, the novel 1,3,4-thiadiazolyl-(2)-ureas can be obtained by reacting a 2-amino-1,3,4-thiadiazole of Formula II with a carbamoyl halide of the Formula VII

wherein $R_3$ and $R_4$ are as defined under Formula I, in the presence of acid-binding agents.

The starting materials of Formula II can be produced by known methods, for example by reacting the appropriately substituted thiosemicarbazides with carbon disulfide in pyridine and then reacting the resulting 2-amino-5-mercapto-1,3,4-thiadiazole with a compound of Formula VI.

$$R_1 - Hal. \qquad (VI)$$

[L. L. Bambas, the Chemistry of Heterocyclic Compounds, page 143 ff, (1952)]. The Formula II of the starting materials embraces besides the known compounds also compounds which have previously not been described. The 5-mercapto-1,3,4-thiadiazolyl-ureas of Formula V are new and can be obtained from 2-amino-5-mercapto-1,3,4-thiadiazoles by reacting the amino group (a) with a halogen carbonic acid phenyl ester or phosgene and an amine of Formula III or (b) with an isocyanate of Formula IV. Some of the 2-amino-5-mercapto-1,3,4-thiadiazoles of Formula II as well as some of the 5-mercapto-1,3,4-thiadiazolyl-ureas of Formula V have microbiocidal properties.

The novel 1,3,4-thiadiazolyl-(2)-ureas of Formula I have excellent herbicidal properties and can be employed for the control of mono- and dicotyl weeds and wild grasses. The urea derivatives of Formula I in which at least one of $R_2$ or $R_2$ or $R_3$ is hydrogen have especially good herbicidal activity. In high concentrations, the new ureas have especially good herbical activity. In high concentrations, the new ureas have a total herbicidal effect, in lower concentrations they have a selective herbicidal effect. The action of these substances includes the types of weeds which are difficult to control as well as the deep rooted types, e.g. leguminous and umbelliferous plants. They can be applied with equal success before (preemergence) and after emergence (postemergence) of the plants. Thus field weeds, such as types of millet (Panicum sp.), types of mustard (Sinapis sp.), types of goose foot (Chenopodiaceae), field foxtail (Alopecurus agrestis), types of chamomile (Matricaria sp.), can be destroyed or their growth can be hindered without damaging cultivated plants such as grains, etc.

The following 1,3,4-thiadiazolyl ureas are used as test compounds to determine their herbicidal activity. The number beside each compound correspond to the number of active substance in the subsequent test. The percentages of the formulations used are given by weight.

1 N-[5-methylthio-1,3,4-thiadiazolyl-(2)]-N,N'-dimethyl-urea
2 N-[5-methylthio-1,3,4-thiadiazolyl-(2)]-N'-methyl-urea,
3 N-[5-propinylthio-1,3,4-thiadiazolyl-(2)]-N'-methyl-urea,
7 N-[5-(2'-chloroallylthio)-1,3,4-thiadiazolyl-(2)]-N'-methyl-urea,
5 N-[5-(2'-chloroallylthio)-1,3,4-thiaziazolyl-(2)]-N,N'-dimethyl-urea,
6 N-[5-isopropylthio-1,3,4-thiadiazolyl-(2)-N'-methyl-urea,
7 N-[5-methylthio-1,3,4-thiadiazolyl-(2)]-N',N'-methyl-urea,
8 N-[5-methylthio-1,3,4-thiadiazolyl-(2)]-N-cyclopropyl-urea,
9 N-[5-methylthio-1,3,4-thiadiazolyl-(2)]-N,N'-diethyl-urea,
10 N-[5-Methylthio-1,3,4-thiadiazolyl-(2)]-N-methoxy-N'-methyl-urea,
11 N[5-isopropylthio-1,3,4-thiadiazolyl-(2)]-N',N'-dimethyl-urea,
12 N-[5-(2'-ethoxyethylthio)-1,3,4-thiadiazolyl-(2)]-N'-methyl-urea,
13 N-[5-(3'-iodopropinylthio)-1,3,4-thiadiazolyl-(2)]-N'-methyl-urea,
14 N-[5-(2'-chloroallylthio)-1,3,4-thiadiazolyl-(2)]-N',N'-dimethyl-urea,
15 N-[5-(2'-ethoxyethylthio)-1,3,4-thiadiazolyl-(2)]-N'-N',N'-dimethyl-urea,
16 N-[5-methylthio-1,3,4-thiadiazolyl-(2)]-N'-methyl-N'-n-butyl-urea,
17 N-[5-allylthio-1,3,4-thiadiazolyl-(2)]-N'-methyl-urea,
18 N-[5-ethylthio-1,3,4-thiadiazolyl-(2)]-N'-methyl-urea,
19 N-[5-methylthio-1,3,4-thiadiazolyl-(2)]-N'-cyclopropyl-urea,
20 N-[5-methylthio-1,3,4-thiadiazolyl-(2)]-N'-allyl-urea,
21 N-[5-allylthio-1,3,4-thiadiazolyl-(2)]-N',N'-dimethyl-urea,
22 N-[5-methylthio-1,3,4-thiadiazolyl-(2)]-N'-methyl-N'-(3'-butin-2-yl) -urea.

a. Germination test

Method:

The active substance is mixed with an inert carrier (talcum) in a ratio of 1:9 and the resulting 10%-formulation is mixed with garden soil. The active substance is applied to a concentration of 0.5 g per liter of soil. The soil is filled into flower pots, and oats, ray grass, mustard and vetch are sowed therein. The results observed 20 days after sowing are expressed according to the following values:
10 = normal growth The phytotoxic activity is determined both for cultivated plants and weeds 62 days after application of the active substance. A known herbicidal substance is also tested for comparison.

| Concentration of active substance in kg/100 m² | | 3 | 2 | 1 |
|---|---|---|---|---|
| Herbicidal action in % on the autochton weeds | N-[5-methylthio-1,3,4-thiadiazolyl-(2)]-N,N'-dimethyl-urea | 95% | 90% | 90% |
| | N-[1,3-Benzthiazolyl-(2)]-N'-methyl-urea (known from the U.S. Pat. No. 2,756,135) | 30% | 0% | 0% |
| Phytotoxic action on oat | N-[5-Methylthio-1,3,4-thiadiazolyl-(2)]-N,N'-dimethyl-urea | 2 | 2 | 2 |
| | N-[1,3-Benzthiazolyl-(2)]-N'-methyl-urea (known from the U.S. Pat. No. 2,756,135) | 1 | 1 | 1 |

9-1 = graduated increase in damage
0 = all plants destroyed.

b. Contact test

Method:
Flowerpots filled with soil are sowed with oats and mustard. The active substance is applied in the form of an emulsion prepared from a 25% emulsion concentrate. The concentration is 0.5 g of active substance of 100 ml of water per m². The treatment is effected when the mustard reaches the 4 – 6 leaf stage. The results are observed 14 days after treatment and are expresses as above under (a).

Results of germination and contact tests

| active substance | Germination test (effect after 20 days) | | | | Contact test (effect after 14 days) | |
|---|---|---|---|---|---|---|
| | oats | ray grass | mustard | vetch | oats | mustard |
| 1 | 0 | 0 | 0 | 0 | 2 | 0 |
| 2 | 0 | 0 | 0 | 0 | 3 | 0 |
| 3 | 0 | 0 | 0 | 0 | — | — |
| 4 | 0 | 0 | 0 | 0 | 7 | 0 |
| 5 | 0 | 0 | 0 | 0 | 1 | 0 |
| 6 | 0 | 0 | 0 | 0 | — | — |
| 7 | 0 | 0 | 0 | 0 | 7 | 0 |
| 8 | 0 | 0 | 0 | 0 | 7 | 0 |
| 9 | 0 | 0 | 0 | 0 | — | — |
| 10 | 0 | 0 | 0 | 0 | 4 | 0 |
| 11 | 0 | 0 | 0 | 0 | 7 | 1 |
| 12 | 0 | 0 | 0 | 0 | 3 | 2 |
| 13 | 1 | 0 | 0 | 2 | — | — |
| 14 | 0 | 0 | 0 | 0 | 0 | 0 |
| 15 | 0 | 0 | 0 | 0 | 1 | 0 |
| 16 | 0 | 0 | 0 | 1 | 2 | 0 |
| 17 | 0 | 0 | 0 | 1 | 1 | 0 |
| 18 | 0 | 0 | 0 | 0 | 1 | 0 |
| 19 | 0 | 0 | 0 | 0 | — | — |
| 20 | 0 | 0 | 0 | 0 | — | — |
| 21 | 0 | 0 | 0 | 2 | — | — |
| 22 | 1 | 0 | 0 | 2 | — | — |

Preemergence-test with oats

Method:
The test plant (oat) is sown into a freshly prepared seed-bed. Hereupon the active substance to be tested is applied to the bed as an aqueous dispersion prepared from a 25% wettable powder in a ratio of 110 ml dispersion per square meter of soil. Autochton weeds are: *Chemopodium album, Polygonum pers., Capsella bursa past., Sinapis arv.*
Result:

Conclusion
The known herbicide shows when applied at the same concentration no or only slight phytotoxic action on oat and weeds while the active substance according to this invention posesses an excellent selective herbicidal activity.

In the following 3 tests the compounds listed below are used as active substance:

I  N-[5-methylthio-1,3,4-thiadiazolyl-(2)]-N,N'-dimethyl-urea (according to this invention)
II N-[5-methylthio-1,3,4-thiadiazolyl-N'-methyl-urea (according to this invention)
III N-[1,3-benzthiazolyl-(2)]-N'-methyl-urea (known from the U.S. Pat. No. 2,756,135)
IV N-[3-trifluoromethylphenyl]-N',N'-dimethyl-urea (known from the Belgian Pat. No. 594,227)
V  N-(3,4-dichlorophenyl)-N',N'-dimethyl-urea (known from the U.S. Pat. Nos. 2,655,444 – 447)

The roman numbers given beside the compounds correspond to the ones of active substance used in the tests. Preemergence-test with lin Method:
The test plant (lin) is sown into a freshly prepared seed bed. Hereupon the active substance to be tested is applied to the bed as an aqueous dispersion prepared from a 25% wettable powder in a ratio of 110 ml per square meter of soil. Autochton weeds are: *Chenopodium album, Polygonum pers., Capsella burs. past., Sinapis arv.*

Result:
The phytotoxic effect on both, the cultivated plant and the weeds is determined 32 days after application of the active substance.

| Active substance application 0.75 kg/100 m² | Herbicidal action in % on autochton weeds | Phytotoxic action on lin |
|---|---|---|
| I | 90 | 1 |
| II | 90 | 1 |
| III | 0 | 1 |
| IV | 70 | 1 |
| V | 55 | 1 |

Conclusion:
The known substances at the applied concentration show no phytotoxic effects on lin but they do not only insufficiently control the autochton weeds. The compounds according to this invention show a very good action against the weeds and are equally compatible with lin.

Herbicidal action on weeds in preemergence application

Test plants: *Galium apar.*, *Pastinaca sat.*, *Sinapis alba*, *Vicia sat.*; the autochton weeds are not considered.

Method:
The above mentioned seeds are sown into a freshly prepared seed bed. The active substance to be tested is applied to the bed as an aqueous suspension, prepared from a 25% wettable powder directly after sowing in such a manner that 200 or 100 ml of suspension are used per square meter.

Result:
The herbicidal action was ascertained 34 days after the application. Known herbicides are also applied for comparison.

| Active substance applied in a concentration of 2; 1 kg/100 m$^2$ | Phytotoxic action | | | | | | | |
|---|---|---|---|---|---|---|---|---|
| | *Galium apar.* | | *Pastinaca sat.* | | *Sinapis alba* | | *Vicia sat.* | |
| | 2 | 1 | 2 | 1 | 2 | 1 | 2 | 1 |
| I | 8 | 8 | 7 | 7 | 8 | 8 | 9 | 9 |
| II | — | — | — | — | — | — | 9 | 9 |
| III | 1 | 1 | 1 | 1 | 1 | 1 | 1 | 1 |
| IV | 9 | 2 | 2 | 1 | 1 | 1 | 7 | 4 |
| V | 4 | 3 | 1 | 1 | 5 | 3 | 7 | 3 |

Conclusion:
In this test, the compounds according to this invention proved to be superior for combatting and planted problem weeds over the known herbicides.

Herbicidal action on weeds in maize in postemergence application

Method:
The problem weeds *Galium apar.* and *Pastinaca sat.* together with maize as the plant to be cultivated are sown into a freshly prepared seed bed.

The active substance was sprayed as an aqueous suspension, prepared from a 25% wettable powder onto the seed-bed 22 days after emergence of the plants. The autochton weeds were *Chenopodium album*, *Polygonum pers.*, *Capsella bursa past.*, *Sinapis arv.*

Result:
The phytotoxic action on the cultivated plant and on the sown weeds as well as the herbicidal action on the autochton weeds were evaluated 31 days after application of the substance to be tested. Known herbicides were used in this test in order to compare the results.

| Active substance concentration 1 and 0.5 kg/100 m$^2$ | Herbicidal action on the autochton weeds | | Phytotoxic action | | | | | |
|---|---|---|---|---|---|---|---|---|
| | | | *Galium apar.* | | *Pastinaca sat.* | | Maize | |
| | 1 | 0.5 | 1 | 0.5 | 1 | 0.5 | 1 | 0.5 |
| I | 100 | 95 | 9 | 9 | 9 | 9 | 1 | 1 |
| II | 98 | 95 | 8 | 8 | 9 | 9 | 1 | 1 |
| III | 0 | 0 | 1 | 1 | 2 | 1 | 1 | 1 |
| IV | 98 | 90 | 1 | 1 | 1 | 1 | 1 | 1 |

Conclusion:
Only the compounds according to this invention show the desired herbicidal effect in maize cultures.

Total herbicidal test

Method:
A meadow having a lot of weeds is treated in the middle of summer with an aqueous dispersion of the active substance, prepared from a 25% wettable powder. The concentration is so calculated that 200 ml of dispersion are sprayed per square meter.

Result:
The herbicidal effect is evaluated after 98 days. Known herbicides are tested for comparison.

| Active substance (applied in concentrations of 20, 6 and 4 kg/ 100 m$^2$) | Herbicidal action on weeds in % concentration of active substance | | |
|---|---|---|---|
| | 20 | 6 | 4 |
| N-[5-methylthio-1,3,4-thiadiazol-(2)]-N,N'-dimethyl-urea (according to this invention | 100 | 98 | 98 |
| N-(3,4-dichlorophenyl)-N,N'-dimethyl-urea (known from U.S. Pat. Nos. 2,655,444 – 447) | 98 | 90 | 50 |
| N-(3,4-dichlorophenyl)-N'-methoxy-N'-methyl-urea (known from U.S. Pat. No. 2,960,534) | 98 | 30 | 0 |

Conclusion:
An application of only 4 kg/100 m$^2$ of the substance according to this invention causes an excellent long lasting herbicidal effect which is achieved when 4 to 5 times the amount of the known substances are applied.

The active substances according to the invention are tolerated by grains. Only in application amounts about 10 kg/ha of active substance does the severe damage become evident, which was already evident by using application amounts of 2 kg/ha and less of the urea derivatives in commercial use: N-phenyl-N',N'-dimethyl-urea (Fenuron) and N-3,4-dichlorophenyl-N',N'-dimethyl-urea (Diuron).

For the preparation of herbicidal agents, the active substances are mixed with suitable carriers and/or dispersing agents. To widen the range of action, these agents can be admixed with other herbicides, for example triazines such as halogen-diamino-s-triazines, alkoxy- and alkylthio-diamino-s-triazines, triazoles, diazines such as uracils, aliphatic carboxylic acids and halogen carboxylic acids, halogenated benzoic acids and phenylacetic acids, aryloxyalkane carboxylic acids, hydrazides, amides, nitriles, esters of such carboxylic acids, carbamic acid esters and thiocarbamic acid esters, ureas, etc.

Representatives of such herbicidally active substances which can be admixed are, e.g., the following compounds:

2-chloro-4,6-bis-(ethylamino)-s-triazine,
2-chloro-4-ethylamino-6-isopropylamino-s-triazine,
2-chloro-4,6-bis-(methoxypropylamino)-s-triazine,
2-methoxy-4,6-bis-(isopropylamino)-s-triazine,
2-diethylamino-4-isopropylacetamido-6-methoxy-s-triazine,
2-isopropylamino-4-methoxypropylamino-6-methylthio-s-triazine,
2-methylthio-4,6-bis-(isopropylamino)-s-triazine,
2-methylthio-4,6-bis-(ethylamino)-s-triazine,
2-methylthio-4-ethylamino-6-isopropylamino-s-triazine,
2-methoxy-4-ethylamino-6-isopropylamino-s-triazine,
2-methoxy-4,6-bis-(ethylamino)-s-triazine,
2-chloro-4,6-bis-(isopropylamino)-s-triazine,
5-bromo-3-sec-butyl-o-methyl-uracil, 5-amino-5-chloro-1-phenyl-pyridazone-(6),
3,6-dioxo-1,2,3,6-tetrahydropyridazine,
dinitro-sec-butylphenol and salts thereof,
pentachlorophenol and salts thereof,
trichloroacetic acid and salts thereof,
2,2-dichloropropionic acid and salts thereof,
2-chloro-N,N-diallylacetic acid amide,
maleic acid hydrazide,
2,3,6-trichlorobenzoic acid and salts thereof,
2,3,5,6-tetrachlorobenzoic acid and salts thereof,
2-methoxy-3,5,6-trichlorobenzoic acid and salts thereof,
2-methoxy-3,6-dichlorobenzoic acid and salts thereof,
3-amino-2,5-dichlorobenzoic acid and salts thereof,
3nitro-2,5-dichlorobenzoic acid and salts thereof,
2-methyl-3,6-dichlorobenzoic acid and salts thereof,
2,6-dichlorobenzonitrile,
2,6-dichlorothiobenzamide,
2,3,6-trichlorophenylacetic acid and salts thereof,
2,4-dichlorophenoxyacetic acid and salts thereof,
2,4,5-trichlorophenoxyacetic acid, and salts and esters thereof,
(2-methyl-4-chlorophenoxy)-acetic acid, and salts and esters thereof,
2-(2,4,5-trichlorophenoxy)-propionic acid, and salts and esters thereof,
2-(2,4,5-trichlorophenoxy)-ethyl-2,2-dichloropropionate,
4-(2,4-dichlorophenoxy)-butyric acid, and salts and esters thereof,
4-(2-methyl-4-chlorophenoxy)-butyric acid, and salts and esters thereof,
2,3,6-trichlorobenzyloxypropanol,
4-amino-3,5,6-trichloropicolinic acid,
N'-cylooctyl-N,N-dimethyl-urea,
3-phenyl-1,1-dimethyl-urea,
3-(4'-chlorophenyl)-1,1-dimethyl-urea,
3-(3'-trifluoromethylphenyl)-1,1-dimethyl-urea,
3-(3',4'-dichlorophenyl)-1,1-dimethyl-urea,
3-(3',4'-dichlorophenyl)-1-n-butyl-1-methyl-urea,
3-(3',4'-dichlorophenyl)-1,1,3-trimethyl-urea,
3-(3',4'-dichlorophenyl)-1,1-diethyl-urea,
3-(4'-chlorophenyl)-1-methoxy-1-methyl-urea,
3-(3',4'-dichlorophenyl)-1-methoxy-1-methyl-urea,
3-(4'-bromophenyl)-1-methoxy-1-methyl-urea,
3-(3',4'-dichlorophenyl)-3-methoxy-1,1-dimethyl-urea,
3-(4'-chlorophenoxyphenyl)-1,1-dimethyl-urea,
N,N-di-(n-propyl)-S-ethyl-thiocarbamate,
N,N-di-(n-propyl)-S-n-propyl-thiocarbamate,
N-ethyl-N-(n-butyl)-S-n-propyl-thiocarbamate,
N-phenyl-O-isopropyl-carbamate,
N-(m-chlorophenyl)-O-isopropyl-carbamate,
N-(m-chlorophenyl)-O-4-chloro-butyn-(2)-yl-carbamate,
N-(3',4'-dichlorophenyl)-O-methyl-carbamate.

The following examples illustrate the process for the production of the new compounds of Formula I. Where not stated otherwise, temperatures are expressed in degrees centigrade and parts and percentages are by weight.

EXAMPLE 1

N-[5-methylthio-1,3,4-thiadiazolyl-(2)]-N'-methyl-urea 44.2 parts of 5-methylthio-2-amino-1,3,4-thiadiazole (m.p. 177°–178°) are dissolved in 200 parts of benzene and at room temperature added dropwise during 30 minutes to 19 parts of methyl isocyanate. The mixture is then stirred for 2 hours at 30° to 40°. After cooling, the precipitated product is filtered, washed with a little benzene and dried. N-[5-methylthio-1,3,4-thiadiazolyl-(2)]-N'-methyl-urea: m.p. 256° (with decomposition).

The starting material is produced as follows:

91 parts of thiosemicarbazide are suspended in 1000 parts of pyridine and during ¾ hour added dropwise to 120 parts of carbon disulfide. The mixture is then slowly heated to the boil and refluxed until all of the material is dissolved. After the pyridine has been evaporated in vacuo, the crude residue is methylated in an ethanolic potassium hydroxide solution with methyl iodide. 5-Methylthio-2-amino-1,3,4-thiadiazole (ca. 75–80% yield), m.p. 177°–178° (from water), is obtained.

By using the appropriate 5-thio-2-amino-1,3,4-thiadiazoles and equimolar amounts of the corresponding isocyanates, the compounds listed in Table 1 were obtained in the manner described in the above example.

TABLE 1

| | Compounds: | Melting point |
|---|---|---|
| 1. | N-[5-methylthio-1,3,4-thiadiazolyl-(2)]-N-allyl-N'-methyl-urea | 125 – 127° |
| 2. | N-[5-methylthio-1,3,4-thiadiazolyl-(2)]-N-isopropyl-N'-methyl-urea | 108 – 111° |
| 3. | N-[5-methylthio-1,3,4-thiadiazolyl-(2)]-N-cyclopropyl-N'-methyl-urea | 126 – 128° |
| 4. | N-[5-methylthio-1,3,4-thiadiazolyl-(2)]-N-allyl-N'-methyl-urea | 162 – 163° |
| 5. | N-[5-(2'-chloroallylthio)-1,3,4-thiadiazolyl-(2)]-N,N'-dimethyl-urea | 91 – 92° |
| 6. | N-[5-(2'-chloroallylthio)-1,3,4-thiadiazolyl-(2)]-N-isopropyl-N'-methyl-urea | 94 – 95° |
| 7. | N-[5-propargylthio-1,3,4-thiadiazolyl-(2)]-N'-methyl-urea | 182 – 184° |
| 8. | N-[5-isopropylthio-1,3,4-thiadiazolyl-(2)]-N'-methyl-urea | 170 – 171° |
| 9. | N-[5-methylthio-1,3,4-thiadiazolyl-(2)]-N-methyl-N'-methyl-urea | 158 – 160° |
| 10. | N-[5-methylthio-1,3,4-thiadiazolyl-(2)]-N-cyclohexyl-N'-methyl-urea | 98 – 101° |
| 11. | N-[5-methylthio-1,3,4-thiadiazolyl-(2)]-N'-allyl-urea | 153 – 155° |
| 12. | N-[5-methylthio-1,3,4-thiadiazolyl-(2)]-N'-cyclopropyl-urea | 184° |
| 13. | N-[5-methylthio-1,3,4-thiadiazolyl-(2)]-N'-cyclohexyl-urea | 174 – 176° |
| 14. | N-[5-methylthio-1,3,4-thiadiazolyl-(2)]-N'-bicyclo[4,1,0]heptyl-urea | 185° |
| 15. | N-[5-methylthio-1,3,4-thiadiazolyl-(2)]-N'-octahydro-methenopentalenyl-urea | 232° |
| 16. | N-[5-methylthio-1,3,4-thiadiazolyl-(2)]-N'-$\beta$-chloroethyl-urea | 165 – 167° |
| 17. | N-[5-$\beta$-ethoxy-ethylthio-1,3,4-thiadiazolyl-(2)]-N'-methyl-urea | 152 – 153° |
| 18. | N-[5-$\beta$-ethylthio-ethylthio-1,3,4-thiadiazolyl-(2)]-N'-methyl-urea | 172 – 173° |
| 19. | N-[5-allylthio-1,3,4-thiadiazolyl-(2)]-N',N'-dimethyl-urea | 78 – 80° |
| 20. | N-[5-$\beta'$-Iodopropargylthio-1,3,4-thiadiazolyl-(2)]-N,N'-dimethyl-urea | 177 – 178° |
| 21. | N-[5-methylthio-1,3,4-thiadiazolyl-(2)]-N'-$\beta$-methoxyethyl-urea | 149 – 151° |
| 22. | N-[5-methylthio-1,3,4-thiadiazolyl-(2)]-N'-$\beta$-methylthioethyl-urea | 132 – 135° |
| 23. | N-[5-cyclohexylthio-1,3,4-thiadiazolyl-(2)]-N'-methyl-urea | 195 – 199° |
| 24. | N-[5-(2'-chloroallylthio)-1,3,4-thiadiazolyl-(2)]-N'-methyl-urea | 162 – 163° |

EXAMPLE 2

N-[5-methylthio-1,3,4-thiadiazolyl-(2)]-N',N'-dimethyl-urea 14.7 parts of 5-methylthio-2-amino-1,3,4-thiadiazole and 10 parts of triethylamine are dissolved in 150 parts of chloroform, and at 0°– 5° with stirring are treated with 15.6 parts of phenyl chloroformate. Stirring is continued for 2 hours at 20°. The mixture is treated with ice water, thoroughly shaken, and the chloroform layer is separated, dried and concentrated. The residue is recrystallized in alcohol. 25.7 parts (96%) of phenyl N-[5-methylthio-1,3,4-thiadiazolyl-(2)]-carbamate, m.p. 171°, are obtained.

The carbamate obtained is suspended in 100 parts of benzene and refluxed. A weak stream of 10 to 20 parts of dry dimethylamine is conducted through the boiling mixture. After completion of the reaction, the benzene is evaporated in vacuo. The residue is thoroughly stirred with cold water, filtered and then recrystallized from water. 13.6 parts (65%) of N-[5-methylthio-1,3,4-thiadiazolyl-(2)]-N',N'-dimethyl-urea, m.p. 192°–194°, are obtained.

In the manner described in this example, using the appropriate 1,3,4-thiadiazole and phenyl chlorocarbonate, the corresponding phenyl carbamates are obtained, from which by reacting with the appropriate secondary amines the following compounds listed in Table 2 were obtained.

TABLE 2

| Compounds | Melting point |
| --- | --- |
| 1. N-[5-allylthio-1,3,4-thiadiazolyl-(2)]-N,N'-dimethyl-urea | 170 – 172° |
| 2. N-[5-methylthio-1,3,4-thiadiazolyl-(2)]-N'-methyl-N'-1'-methyl-propynyl-urea | 96 – 98° |
| 3. N-[5-methylthio-1,3,4-thiadiazolyl-(2)]-N'-methyl-N'-methoxy-urea | 116 – 118° |
| 4. N-[5-cyclohexylthio-1,3,4-thiadiazolyl-(2)]-N',N'-dimethyl-urea | 115 – 117° |
| 5. N-[5-(2'-chloroallylthio)-1,3,4-thiadiazolyl-(2)]-N',-diethyl-urea | 118 – 119° |

EXAMPLE 3

N-[5-ethylthio-1,3,4-thiadiazolyl-(2)]-N'-methyl-urea 19 parts of N-[5-mercapto-1,3,4-thiadiazolyl-(2)]-N'-methyl-urea (m.p.: 230°–231° decomposition) are dissolved in 100 parts by volume of ethanol to which 4 parts of sodium hydroxide, dissolved in a little water, have been added. Then during 30 minutes, 15.6 parts of ethyl iodide are added dropwise at 20° and the mixture is stirred for 2 hours at 50°. The clear solution is evaporated to dryness, the residue is slurried with 100 parts by volume of water and filtered. The N-[5-ethylthio-1,3,4-thiadiazolyl-(2)]-N'-methyl-urea is recrystallized from water, m.p. 194°–196°.

EXAMPLE 4

N-[5-methylthio-1,3,4-thiadiazolyl-(2)]N',N'-diethyl-urea 200 parts by volume of chloroform are saturated with phosgene at 0° to 5° and, at the same temperature and simultaneously introducing phosgene, treated with 25 parts of 5-methylthio-2-amino-1,3,4-thiadiazole. The mixture is stirred for 3 hours at the same temperature and then evaporated to dryness under vacuum. The solid residue is suspended in 200 parts by volume of benzene and, at 0° to 5°, treated with an excess of 2 to 3 times the amount of diethylamine (ca. 35 parts). The mixture is stirred for 3 hours at room temperature and the undissolved material is removed by filtration. The filtrate is then evaporated to dryness under vacuum and the residue, namely N-[5-methylthio-1,3,4-thiadiazolyl-(2)-N',N'-diethyl-urea, is recrystallized from ethanol, m.p. 154°–155°.

The production of herbicical agents according to the invention is performed in a known manner by intimate mixing and grinding of active substances of the general Formula I together with suitable carriers, optically with the addition of dispersing agents or solvents, which are inert towards the active substances. The active substances can be used and applied in the following forms:

solid preparations: dusts, scattering agents, granulates, coated granulates, impregnated granulates and homogeneous granulates;

water-dispersible concentrates of the active substance: wettable powders, pastes, emulsions;

liquid preparations: solutions, aerosols.

For the production of solid preparations (dusts, scattering agents, granulates) the active ingredients are mixed with solid carriers. The particle size of the carriers is from about 0.075 to 0.2 mm for dusts, and 0.2 mm or more for granulates. The concentration of active ingredient in the solid preparations is usually 0.5 to 80%. These mixtures can also contain additives which stabilize the active ingredient and/or substances which are non-ionic, or anionically or cationically active, which substances, for example, improve the adhesion of the active ingredients on plants or parts of plants (adhesives and agglutinants) and/or ensure a better wettability (wetting agents) and dispersibility (dispersing agents).

Water-dispersible concentrates of the active substance, wettable powders, pastes and emulsion concentrates, are agents which can be diluted with water to any desired concentration. They consist of active substances, carrier, optionally additives for stabilizing the active substance, surface-active substances and antifoaming agents, and optionally solvents. The concentration of active substance in these preparations is from 5 to 80%. The wettable powders and pastes are obtained by mixing and grinding the active substances with dispersing agents and pulverulent carriers in suitable equipment until the products are homogeneous. In some cases it is advantageous to use mixtures of different carriers. The anti-foaming agents may, for example, be silicones. The active substances are so mixed, ground, sieved and classified with the above-mentioned additives that in the wettable powders the solid fraction does not exceed a grain size of 0.02 to 0.04 and in pastes does not exceed 0.003 mm. Dispersing agents, organic solvents and water are used for the preparation of emulsion concentrates and pastes. The solvents must be practically odorless, non-phytotoxic, inert towards the active substances and not easily combustible.

Furthermore, the agents according to the invention may be applied in the form of solutions. For this purpose, one or more of the active substances of the general Formula I is or are dissolved in suitable organic solvents, mixtures of solvents, or water. The concentration of the active substances contained in the solutions should be in the range of 1 to 20%. Other biocidal active substances or agents can be admixed with the agents described according to the invention. Thus, in addition to the said compounds of the general Formula I and other herbicides, the new agents may contain, for example, insecticides, fungicides, bactericides, fungistatic and bacteriostatic substances or nematocides in order to broaden the range of action.

The agents according to the invention may also contain plant fertilizers, trace elements, etc.

Preparations containing the new ureas are described below. Parts and precentages are expressed by weight.

Granulate

The following ingredients are used to produce a 5% granulate:
5 parts of N-[5-methylthio-1,3,4-thiadiazolyl-(2)]-N-allyl-N'-methyl-urea,
0.25 part of epichlorohydrin,
0.25 part of cetyl polyglycol ether with 8 mols of ethylene oxide,
3.50 parts of polyglycol "Carbowax", molecular weight about 400,
91 parts of kaolin (particle size 0.3 – 0.8 mm).

The active ingredient is mixed with epichlorohydrin and dissolved with 6 parts of acetone, then the polyglycol and cetyl polyglycol ether are added. The resulting solution is sprayed into kaolin and the acetone is then evaporated in vacuo.

Wettable powder

The following components are used for the preparation of (a) 50%, (b) 25% and (c) 10% wettable powders:
a. 50 parts of N-]5-methylthio-1,3,4-thiadiazolyl-(2)]-N,N'-dimethyl-urea,
5 parts of sodium dibutylnaphthyl sulfonate,
3 parts of naphthalene sulfonic acid/phenol sulfonic acid/formaldehyde codensation product 3:2:1,
20 parts of kaolin,
22 parts of Champagne chalk;
b. 25 parts of N-[5-methylthio-1,3,4-thiadiazolyl-)2)]-N'-methyl-urea,
5 parts of the sodium salt of oleylmethyl tauride,
2.5 parts of naphthalene sulfonic acid/formaldehyde condensation product,
0.5 part of carboxymethyl cellulose,
5 parts of neutral potassium aluminum silicate,
62 parts of kaolin;
10 parts of N-(5-propyn-(2)yl-(1)-thio-1,3,4-thiadiazolyl-(2)]-N'-methyl-urea,
3 parts of mixture of sodium salts of saturated fatty alcohol sulfates,
5 parts of naphthalene sulfonic acid/formaldehyde condensation product,
82 parts of kaolin.

The given active ingredient is absorbed onto the corresponding carrier (kaolin and chalk) and then mixed and ground. Wettable powders have excellent wettability and suspensibility are obtained. By dilution with water, suspensions of any desired concentration of the active ingredients can be obtained from such wettable powders. Such suspensions are suitable for the control of weeds and wild grasses in cultivated plantations.

Paste

The following ingredients are used for the preparation of a 45% paste:
45 parts of N-[5-methylthio-1,3,4-thiadiazolyl-(2)]-N-allyl-N'-methyl-urea,
5 parts of sodium aluminium silicate,
14 parts of cetyl polyglycol ether with 8 mols of ethylene-oxide (Genapol 0 080),
1 part of cetyl polyglycol ether with 8 mols of ethylene-oxide (Genapol 0 050),
2 parts of spindle oil,
10 parts of polyglycol "Carbowax", molecular weight about 400,
23 parts of water.

The active ingredient is intimately mixed and ground in suitable equipment with the additives. A paste is obtained which can be diluted with water to prepare suspensions of any desired concentration. These suspensions are suitable for the treatment of vegetable plantations.

Emulsion concentrate

To prepare a 10% emulsion concentrate
10 parts of N-[5-propargylthio-1,3,4-thiadiazolyl-(2)]-N'-methyl-urea,
15 parts of oleyl polyglycol ether having 8 mol of ethylene oxide, and
75 parts of isophorone (3,5,5-trimethylcyclohex-2-en-1-yl-one) are mixed together. This concentrate can be diluted with water to emulsions of suitable concentrations. Such emulsions are suitable for the control of weeds in cultivated plants such as cotton, maize, for which purpose application of about 0.5 to 3 kg of a compound of Formula I per 100 m$^2$ of soil is recommended.

We claim:
1. N-[5-(2'-chloroallylthio)-1,3,4-thiadiazolyl-(2)]-N'-methylurea.
2. N-[5-(2'-chloroallylthio)-1,3,4-thiadiazolyl-(2)]-N,N'-dimethylurea.
3. N-[5-(2'-chloroallylthio)-1,3,4-thiadiazolyl-(2)-N',N'-dimethylurea.

* * * * *